United States Patent
Li

(10) Patent No.: US 9,940,077 B2
(45) Date of Patent: Apr. 10, 2018

(54) PRINT FOR SECURE PICK-UP IN ENTERPRISE ENVIRONMENT USING PERSONAL MOBILE DEVICE AS TOKEN

(71) Applicant: Samsung Electronics Co., Ltd., Suwon-si, Gyeonngi-do (KR)

(72) Inventor: Zhiyun Li, Kenmore, WA (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 187 days.

(21) Appl. No.: 14/682,881

(22) Filed: Apr. 9, 2015

(65) Prior Publication Data
US 2016/0299728 A1     Oct. 13, 2016

(51) Int. Cl.
G06F 3/12      (2006.01)
G06F 21/60     (2013.01)

(52) U.S. Cl.
CPC .......... *G06F 3/1222* (2013.01); *G06F 3/1238* (2013.01); *G06F 3/1292* (2013.01); *G06F 21/608* (2013.01)

(58) Field of Classification Search
CPC ..... G06F 3/1222; G06F 3/1292; G06F 3/1238
USPC .............................................. 358/1.14, 1.15
See application file for complete search history.

(56) References Cited

U.S. PATENT DOCUMENTS

| | | | |
|---|---|---|---|
| 8,189,225 B1 | 5/2012 | Lo et al. | |
| 2002/0075508 A1* | 6/2002 | Luman | G06F 3/1207 |
| | | | 358/1.15 |
| 2003/0007172 A1 | 1/2003 | Takayanagi | |
| 2004/0148335 A1* | 7/2004 | Keeney | G06F 3/1204 |
| | | | 709/201 |
| 2010/0208287 A1 | 8/2010 | Hanaoka et al. | |
| 2011/0075200 A1* | 3/2011 | Goldwater | G06F 3/1205 |
| | | | 358/1.15 |
| 2012/0307284 A1* | 12/2012 | Chien | H04L 63/0807 |
| | | | 358/1.14 |
| 2013/0038896 A1 | 2/2013 | Nalewajek | |
| 2013/0215467 A1 | 8/2013 | Fein et al. | |
| 2014/0126011 A1 | 5/2014 | Park et al. | |

FOREIGN PATENT DOCUMENTS

| | | |
|---|---|---|
| EP | 2264587 A2 | 12/2010 |
| WO | 2014155385 A1 | 10/2014 |

OTHER PUBLICATIONS

Extended European Search Report dated Aug. 11, 2016 in connection with European Application No. 16164543.7, 8 pages.

* cited by examiner

*Primary Examiner* — Andrew H Lam

(57) ABSTRACT

A method and apparatus is provided for managing a secure print job. The method includes receiving a request for the secure print job. The request is received from a first device associated with a user. The method also includes receiving a document file associated with the secure print job. The method also includes sending a secure token to a second device. The method also includes receiving the secure token from a printer. The method also includes sending the document file to the printer.

20 Claims, 4 Drawing Sheets

PRINT FOR SECURE PICK-UP IN ENTERPRISE ENVIRONMENT USING PERSONAL MOBILE DEVICE AS TOKEN

TECHNICAL FIELD

The present application relates generally to secure printing and, more specifically, to a using a mobile device with a secure token to print a document file.

BACKGROUND

In an enterprise environment there are multiple networked printers distributed across each floor. Those printers are generally accessible by all employees in the same group, or same building, or even in the whole company globally. In addition, employees can print to those printers from home via VPN, or from a remote office.

In one method to retrieve printouts securely, a user can manually input credentials. The user types an identification and password at the printer each time they want to print. This is unacceptable to most people due to time involved and complexity.

Another method is to print from a smartphone at a printer. However, the typical business scenario is to print from a computer where the employee can fully view and edit the documents. When the document is in or accessible from the smartphone, this exposes a serious security hole and may not be allowed in many companies. Even when allowed, the smartphone may need to be secure, which can be a challenge. Many document formats also may not be supported on smartphone or not fully supported as on a traditional computer. In an enterprise environment, the document may be encrypted, so the smartphone may not even be able to open the document to print. In many instances, the document may need to be edited before printing, which is difficult on smartphone.

In yet another method of retrieving a printout, an authentication card or keycard can be used to authenticate the user for the print job. In such a solution, a central printing server holds the document sent to printer, until the user swipes the authentication card at the printer. Once authenticated, the document will be transmitted to the selected printer for the actual job. However, the credentials on a card are static, which is not secure. In addition, the card can only perform a single task of authentication.

SUMMARY

A method is provided for managing a secure print job. The method includes receiving a request for the secure print job. The request is received from a first device associated with a user. The method also includes receiving a document file associated with the secure print job. The method also includes sending a secure token to a second device. The method also includes receiving the secure token from a printer. The method also includes sending the document file to the printer.

An apparatus is provided for managing a secure print job. The apparatus includes a memory element and processing circuitry coupled to the memory element. The processing circuitry is configured to receive a request for the secure print job. The request is received from a first device associated with a user. The processing circuitry is also configured to receive a document file associated with the secure print job. The processing circuitry is also configured to send a secure token to a second device. The processing circuitry is also configured to receive the secure token from a printer. The processing circuitry is also configured to send the document file to the printer.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or method.

Figure 1:
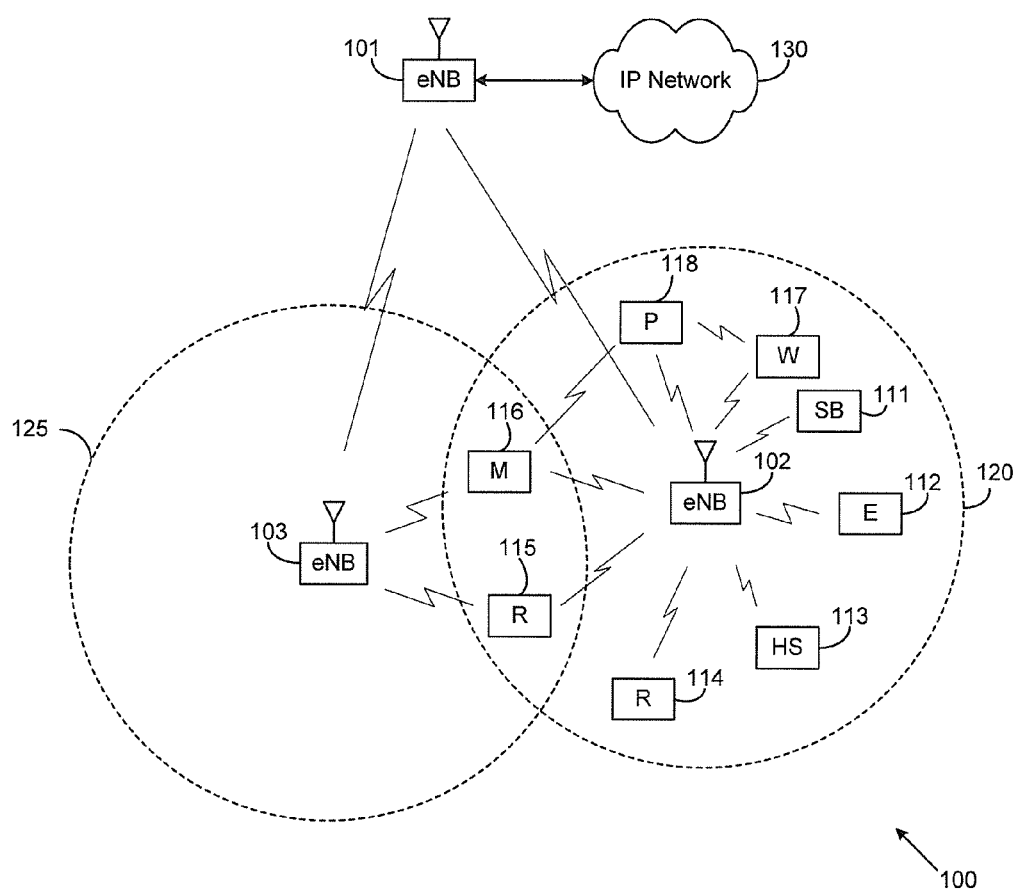
FIG. 1 illustrates an example wireless network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); a UE 116, which may be a mobile device (M) like a cell phone, a wireless laptop, a wireless PDA, or the like; a UE 117, which may be a peripheral or wearable device (W) like a watch, and the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-117 using 5G, LTE, LTE-A, WiMAX, WiFi, or other wireless communication techniques, for example, peripheral wired/wireless networks, such as Wi-Fi Direct, Bluetooth, Ethernet, 802.11a/b/g/n, near field communication (NFC), or magnetic secure transmission (MST).

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "mobile device," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

Wireless network 100 can also include a printer (P) 118 that supports peripheral wired/wireless networks, such as Wi-Fi Direct, Bluetooth, Ethernet, 802.11a/b/g/n, near field communication (NFC), magnetic secure transmission (MST) and the like. In one example embodiment, the communication between the printer (P) 118 and the UEs 111-117 is performed through NFC. NFC is a contactless short-range wireless communication standard between electronic devices within a short distance of 10 cm with low power consumption by using a frequency of 13.56 MHz. A data transfer rate of NFC is 424 Kbps, and NFC has excellent security due to high proximity and encryption technology. NFC forgoes a complicated pairing process of recognition of devices but allows devices to recognize one another within a tenth of a second or less. In particular, NFC is a smart card type contactless wireless communication technology where radio frequency identification (RFID) technology is utilized. In addition, NFC builds upon RFID technology by allowing two-way communication whereas conventional smart cards only allow one-way communication. Furthermore, NFC has a relatively large memory storage space and offers more variety of services.

NFC is a wireless communication method in which data is directly exchanged between terminals, for example, between the printer (P) 118 and the UEs 111-117, without using a communication network, and is a type of RFID method. A wireless communication method using RFID may be classified according to frequencies used. For example, RFID at 13.56 MHz is mainly used for smart cards, such as transit cards or entrance cards, and RFID at 900 MHz is used mainly for logistics. NFC corresponds to RFID, which like smartcards uses a frequency of 13.56 MHz. However, unlike smartcards, which allow only one-way communication, NFC allows two-way communication. NFC is different from smartcards, which function merely as a tag that stores particular information and transmit the same to a reader. NFC allows a tag function according to necessity but also supports a function of recording information on the tag, and may be used in peer-to-peer (P2P) data exchange between terminals in which NFC is set.

The current printing solutions do not solve scenarios where the user wants to pick up the printout securely, either by self or by delegate. The user can be referred to as an "originating user". The originating user is the user who selects a document to be printed and controls a computer to send a print job to a printing server. The delegate can be referred to as a "delegate user". The delegate user is the user who receives a secure token and/or instruction to retrieve a print job from a printer. One or more embodiments of this disclosure recognize and take into account that when using a keycard, there is no way to delegate the printing task to another person. Also, with a smartphone, a user can get status updates and control the printing. Instead of using the smartphone to carry the confidential data, embodiments of this disclosure use a smartphone as a mobile token for the printing tasks. Using the smartphone as a mobile token is completely secure and does not need any special security features on smartphone because the data is never exposed.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2:
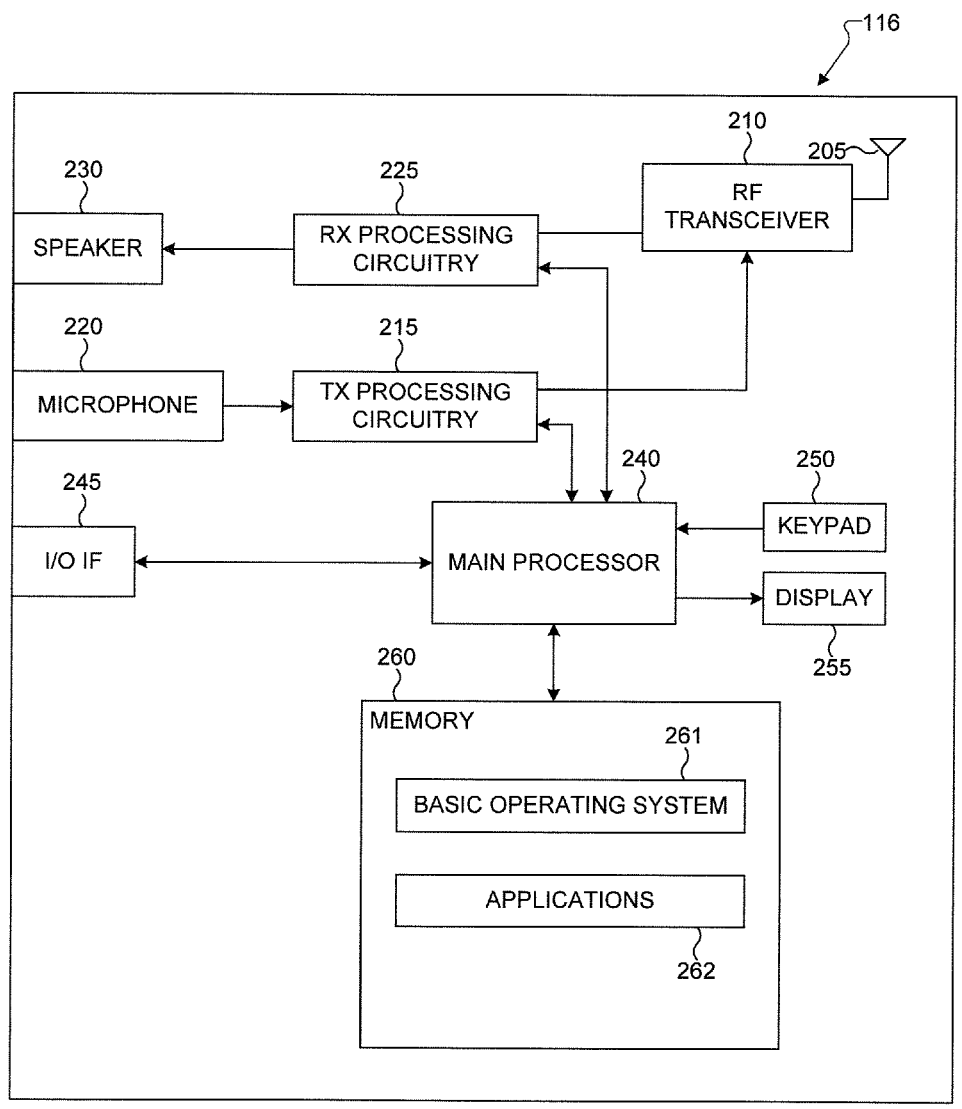
FIG. 2 illustrates an example user equipment (UE) according to this disclosure.

FIG. 2 illustrates an example UE 116 according to this disclosure. The embodiment of the UE 116 illustrated in FIG. 2 is for illustration only, and the UEs 111-115 and 117 of FIG. 1 could have the same or similar configuration. However, UEs come in a wide variety of configurations, and FIG. 2 does not limit the scope of this disclosure to any particular implementation of a UE.

As shown in FIG. 2, the UE 116 includes an antenna 205, a radio frequency (RF) transceiver 210, transmit (TX) processing circuitry 215, a microphone 220, and receive (RX) processing circuitry 225. The UE 116 also includes a speaker 230, a main processor 240, an input/output (I/O) interface (IF) 245, a keypad 250, a display 255, and a memory 260. The memory 260 includes a basic operating system (OS) program 261 and one or more applications 262.

The RF transceiver 210 receives, from the antenna 205, an incoming RF signal transmitted by an eNB of the network 100. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the main processor 240 for further processing (such as for web browsing data).

The TX processing circuitry 215 receives analog or digital voice data from the microphone 220 or other outgoing baseband data (such as web data, e-mail, or interactive video game data) from the main processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna 205.

The main processor 240 can include one or more processors or other processing devices and execute the basic OS program 261 stored in the memory 260 in order to control the overall operation of the UE 116. For example, the main processor 240 could control the reception of forward channel signals and the transmission of reverse channel signals by the RF transceiver 210, the RX processing circuitry 225, and the TX processing circuitry 215 in accordance with well-known principles. In some embodiments, the main processor 240 includes at least one microprocessor or microcontroller.

The main processor 240 is also capable of executing other processes and programs resident in the memory 260. The main processor 240 can move data into or out of the memory 260 as required by an executing process. In some embodiments, the main processor 240 is configured to execute the applications 262 based on the OS program 261 or in response to signals received from eNBs or an operator. The main processor 240 is also coupled to the I/O interface 245, which provides the UE 116 with the ability to connect to other devices such as laptop computers and handheld computers. The I/O interface 245 is the communication path between these accessories and the main processor 240.

The main processor 240 is also coupled to the keypad 250 and the display unit 255. The operator of the UE 116 can use the keypad 250 to enter data into the UE 116. The display 255 may be a liquid crystal display or other display capable of rendering text and/or at least limited graphics, such as from web sites.

The memory 260 is coupled to the main processor 240. Part of the memory 260 could include a random access memory (RAM), and another part of the memory 260 could include a Flash memory or other read-only memory (ROM).

Although FIG. 2 illustrates one example of UE 116, various changes may be made to FIG. 2. For example, various components in FIG. 2 could be combined, further subdivided, or omitted and additional components could be added according to particular needs. As a particular example, the main processor 240 could be divided into multiple processors, such as one or more central processing units (CPUs) and one or more graphics processing units (GPUs). Also, while FIG. 2 illustrates the UE 116 configured as a mobile telephone or smartphone, UEs could be configured to operate as other types of mobile or stationary devices.

In one example embodiment, a user wants to print a confidential document securely. In this example, the printer may be far away from the user. Another person may see the printout before the user reaches or retrieves the printout. So the user may have to run to the printer after printing from a computer to retrieve the printed document. In another example, the printer may be busy, so the user would need to wait at the printer or go back to the computer to cancel the current print job and print to another printer. In another example, there can be other people around the printer when the user is retrieving the printout and the user may not want the other people to see the printout. In another example, the user may forget about the printout and leave it sitting at the printer. In another example, the user may not want to pick up the printout immediately when reviewing and printing a batch of confidential docs and will pick up all in one trip. One or more embodiments of this disclosure recognize and take into account the above examples.

Figure 3:
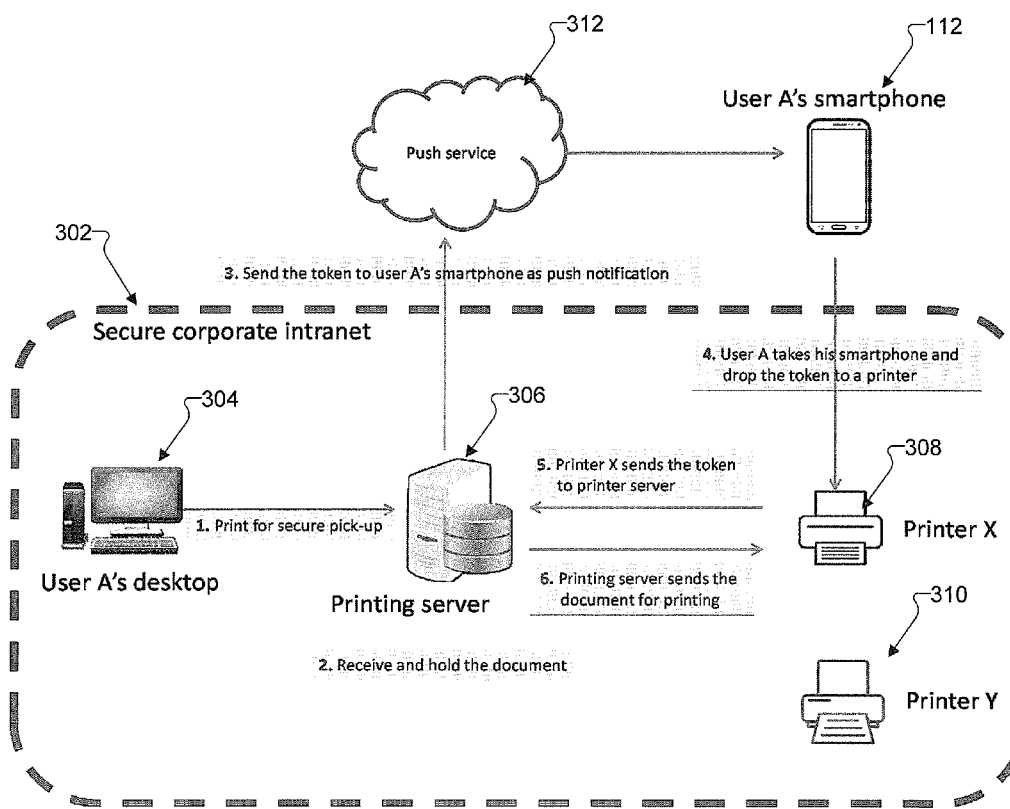
FIG. 3 illustrates an example secure corporate intranet according to this disclosure.

FIG. 3 illustrates an example secure corporate intranet 302 according to this disclosure. The embodiment of the secure corporate intranet 302 illustrated in FIG. 3 is for illustration only. However, a secure corporate intranet can come in a wide variety of configurations, and FIG. 3 does not limit the scope of this disclosure to any particular implementation of a secure corporate intranet.

As shown in FIG. 3, the secure corporate intranet 302 includes User A desktop 304, printing server 306, printer X 308, and printer Y 310. The secure corporate intranet 302 is a computer network that uses Internet Protocol technology to share information, operational systems, or computing services within an organization or enterprise.

User A desktop 304 can be any generic computing device with a processor or processing circuitry. User A desktop 304 is associated with User A. User A uses desktop 304 to send a print job to printing server 306. In one example, User A prints a confidential document on his PC to the printing server, by using the virtual printer. A virtual printer is a piece of computer software whose user interface and API resembles that of a printer driver, but which is not connected with a physical computer printer.

Printing server 306 is a device that connects printers to client computers over secure corporate intranet 302. Printing server 306 accepts print jobs from the computers, such as user A desktop 304 or any computing devices associated with User A inside the secure corporate intranet 302, then holds the print jobs until authorized by user A on one networked printer, and sends the print jobs to the authorized printer. The printing server 306 may queue the print jobs locally to accommodate the fact that work may arrive more quickly than the printer can actually handle. Printing server 306 is operable to receive document files that are documents to be printed, and send those document files as print jobs to printer X 308, printer Y 310, or other printers in the secure corporate intranet 302. The printing server 306 receives the document and holds it. Then it generates a secure token.

Printing server 306 is also operable to manage secure tokens. Secure tokens can include the user's identification (ID), smartphone ID, the document ID, the printing task ID, and the like. In one example embodiment, the secure token is only meaningful for specific user equipment and printers in the secure corporate intranet 302. The secure tokens are intrinsically secure. A secure token can be a software token that is a type of two-factor authentication security device that may be used to authorize the use of computer services. Software tokens are stored on a general-purpose electronic device such as a desktop computer, laptop, PDA, or mobile phone and can be duplicated. This is in contrast to hardware tokens, where the credentials are stored on a dedicated hardware device and therefore cannot be duplicated (absent physical invasion of the device). Security tokens are used to prove one's identity electronically. The token is used in addition to or in place of a password to prove that the user is who they claim to be. The token acts like an electronic key to access something. Some may store cryptographic keys, such as a digital signature, or biometric data, such as fingerprint.

In addition to the user's identity, the secure token can also be used to identify the user's mobile device by including and encrypting the device ID. This can prevent other unauthorized mobile devices from stealing the print jobs. The secure token can also include the document ID and the printing task ID which can be generated dynamically by the printing server 306, such that the secure token is only meaningful for that specific print task and cannot be re-used. Optionally, the secure token may also include a time stamp and expiration time, so that it may expire if the user cannot pick up the print jobs within specified timeframe. Optionally, the secure token may also include the privilege restrictions for operating the print jobs, such as allowing canceling or delegating.

The secure token can be sent to user equipment 112 via push notification through push service 312. Push service 312 can be accessed through wireless network 100 in FIG. 1. In one example, the user equipment 112 is a smartphone associated with User A. Once User A receives the secure token on user equipment 112, the print job can be retrieved at any time, or until canceled or expired. User A can take the user equipment 112, and find an idle printer, such as printer X 308 or printer Y 310, to print the print job that includes the document file.

In one example embodiment, to print the print job, User A can tap the user equipment 112 to the printer X 308. Through NFC or other short-distance communication methods, the secure token is dropped to the printer X 308. The printer X 308 submits the secure token to the printing server 306 with the printer ID for printer X 308. Printing server 306 is operable to verify the secure token and send the document file to the printer X 308 with other regular printing settings. Printer X 308 is operable to print the print job out immediately while User A is physically nearby. Once the print job is complete, expired or canceled, the secure token can be destroyed or invalidated immediately.

In another example embodiment, a user wants to print a document securely for a delegate to retrieve. This situation can occur when the user is not physically nearby or in a meeting and wants the delegate person to pick up the critical printout and bring it to the meeting. In this example, the user may not want to email that document to the delegate because it may be encrypted document that requires a password to open or the user does not want the delegate to be able to redistribute the document. To make sure the delegate can retrieve the printout securely, however, there are a series of inconveniences: the user A may have to use a printer physically near the delegate, add it to the list of printers available for use on user A's computer, and send the print job to the printer; then the user A has to notify the delegate that the printout is ready to pick up and the delegate may need to retrieve the printout immediately. If the user A has a batch of documents for the delegate to pick up during a period of time, the delegate may need multiple trips to the printer to retrieve the printout without anyone else seeing it. A fax would be too cumbersome to operate and won't solve all of the above problems, and would be difficult in a meeting. Even if the document is not that confidential and urgent, the user A may still want to know exactly whether the delegate has picked up the printout. Also, the user A might decide not to print the document and recall the print job if the delegate has not yet retrieved the printout.

Figure 4:
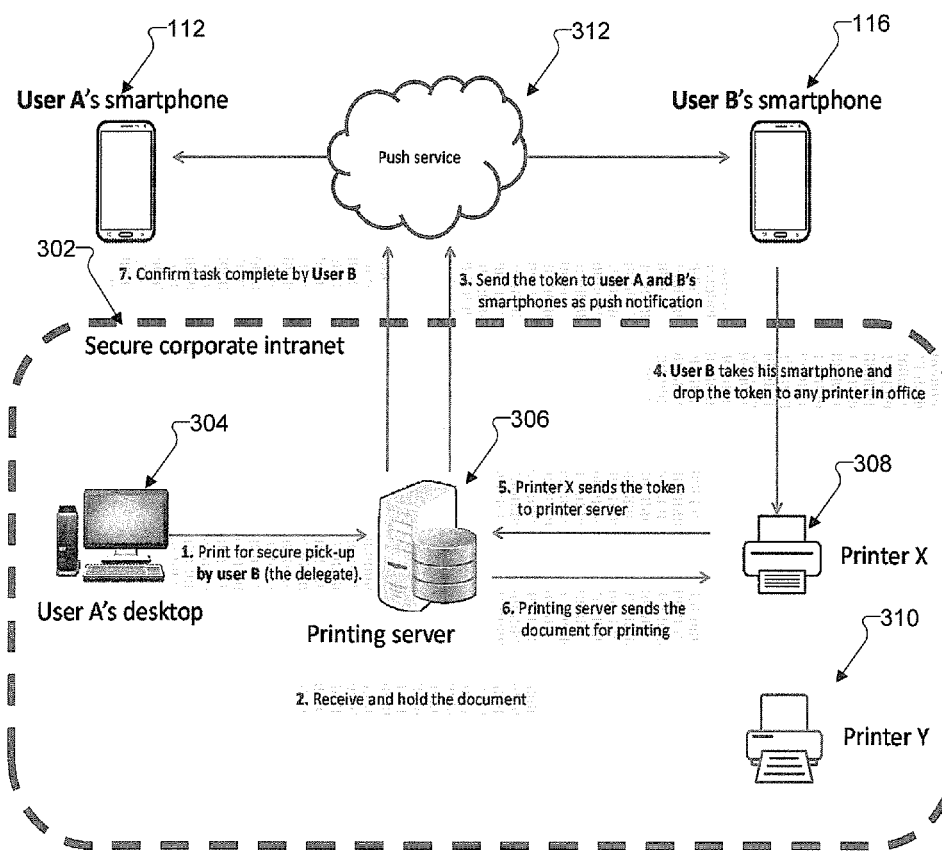
FIG. 4 illustrates an example secure corporate intranet with sending a print job to a delegate user according to this disclosure.

FIG. 4 illustrates an example secure corporate intranet 302 with sending a print job to a delegate user according to this disclosure. The embodiment of the secure corporate intranet 302 illustrated in FIG. 4 is for illustration only. However, a secure corporate intranet can come in a wide variety of configurations, and FIG. 4 does not limit the scope of this disclosure to any particular implementation of a secure corporate intranet.

As shown in FIG. 4, the secure corporate intranet 302 includes User A desktop 304, printing server 306, printer X 308, and printer Y 310. The secure corporate intranet 302 is a computer network that uses Internet Protocol technology to share information, operational systems, or computing services within an organization or enterprise.

User A desktop 304 can be any generic computing device with a processor or processing circuitry. User A desktop 304 is associated with User A. User A uses desktop 304 to send a print job to printing server 306. In one example, User A prints a confidential document on his PC to the printing server, by using the virtual printer. In this example embodiment, User A sends a document file that is confidential to the printing server 306, with the option to assign User B as a delegate to retrieve the print job. It is also possible to include other messages for User B, such as the subject, instructions (e.g. "pick up in 5 minutes and send to executive meeting"), and the like.

The printing server 306 receives the document and holds it. Then it generates a secure token. Printing server 306 is also operable to manage secure tokens. Secure tokens can include User A's identification (ID), User A's smartphone ID, User B's ID, User B's smartphone ID, document ID, the printing task ID, and the like.

This token will be pushed to both A and B's smartphone via push notifications. Alternatively, two different tokens can be used. User B can see receipt of the token and a message on user equipment 116 that indicates to retrieve the print job in five minutes. In some examples, the retrieval job is automatically confirmed, in other examples, User B can accept, decline, or wait for the print job. User A then receives the agreement on user equipment 112 when User B accepts or confirms the retrieval job.

The secure token can be sent to user equipment 112 and user equipment 116 via push notification through push service 312. Push service 312 can be accessed through wireless network 100 in FIG. 1. In one example, the user equipment 112 is a smartphone associated with User A and user equipment 116 is a smartphone associated with User B. Once User A and User B receive the secure tokens, the print job can be retrieved at any time, or until canceled or expired. User B can take the user equipment 116, and find an idle printer, such as printer X 308 or printer Y 310, to print the print job that includes the document file. In one embodiment, the secure token sent to user equipment 112 is the same as the secure token sent to user equipment 116. In another embodiment, the secure tokens are different, for example, the secure token for the delegate User B may authorize fewer privileges, such as not allowing further delegating the print jobs to a third user. In yet a further embodiment, the secure token is only sent to user equipment 116.

In one example embodiment, to print the print job, User B can tap the user equipment 116 to the printer X 308. Through NFC or other short-distance communication methods, the secure token is dropped to the printer X 308. The printer X 308 submits the secure token to the printing server 306 with the printer ID for printer X 308. Printing server 306 is operable to verify the secure token and send the document file to the printer X 308 with other regular printing settings. Printer X 308 is operable to print the print job out immediately while User B is physically nearby. User A can receive a receipt notification once the print job is complete. User A can additionally cancel, or update other pending tasks for User B before the task complete. Once the print job is complete, expired or canceled, the secure token can be destroyed or invalidated immediately.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for managing a secure print job, the method comprising:
   receiving, at a printing server, a request for the secure print job, the request received from a first device associated with an originating user;
   receiving, at the printing server, a document file associated with the secure print job;
   sending, from the printing server, a secure token associated with the secure print job to a second device;
   after sending the secure token, receiving, at the printing server, the secure token associated with the secure print job, from a printer; and
   responsive to receiving the secure token, sending, from the printing server, the document file to the printer.

2. The method of claim 1, wherein the second device is associated with the originating user.

3. The method of claim 1, wherein the request includes a request for a delegate user to retrieve the secure print job, and further comprising:
   sending the secure token to the second device, wherein the second device is associated with the delegate user.

4. The method of claim 3, further comprising:
   sending a confirmation to third device associated with the originating user that the secure print job is complete.

5. The method of claim 1, wherein the secure token comprises one or more of an originating user identification (ID), second device ID, document file ID, and print job ID, privileges and expiration time.

6. The method of claim 1, wherein the request includes a request for a delegate user to retrieve the secure print job, and further comprising:
   sending the secure token to the second device and a third device, wherein the second device is associated with the delegate user and the third device is associated with the originating user.

7. The method of claim 1, wherein the secure token comprises one or more of an originating user identification (ID), delegate user ID, second device ID, third device ID, document file ID, and print job ID, privileges and expiration time.

8. The method of claim 6, wherein printer receives the secure token from the second device by a short-distance communication method.

9. The method of claim 8, wherein the short-distance communication method is near field communication (NFC) or magnetic secure transmission (MST).

10. The method of claim 1, wherein the second device is a user equipment or wearable device.

11. An apparatus, comprising:
    a memory element; and
    processing circuitry coupled to the memory element, the processing circuitry configured to:
      receive a request for a secure print job, the request received from a first device associated with an originating user;
      receive a document file associated with the secure print job;
      send a secure token associated with the secure print job to a second device;
      after sending the secure token, receive the secure token associated with the secure print job from a printer; and
      send the document file to the printer.

12. The apparatus of claim 11, wherein the second device is associated with the originating user.

13. The apparatus of claim 11, wherein the request includes a request for a delegate user to retrieve the secure print job, and further comprising the processing circuitry configured to:
    send the secure token to the second device, wherein the second device is associated with the delegate user.

14. The apparatus of claim 13, further comprising the processing circuitry configured to:
    send a confirmation to third device associated with the originating user that the secure print job is complete.

15. The apparatus of claim 11, wherein the secure token comprises one or more of an originating user identification (ID), second device ID, document file ID, and print job ID, privileges and expiration time.

16. The apparatus of claim 11, wherein the request includes a request for a delegate user to retrieve the secure print job, and further comprising the processing circuitry configured to:
    send the secure token to the second device and a third device, wherein the second device is associated with the delegate user and the third device is associated with the originating user.

17. The apparatus of claim 11, wherein the secure token comprises one or more of an originating user identification (ID), delegate user ID, second device ID, third device ID, document file ID, and print job ID, privileges and expiration time.

18. The apparatus of claim 16, wherein printer receives the secure token from the second device by a short-distance communication method.

19. The apparatus of claim 18, wherein the short-distance communication method is near field communication (NFC) or magnetic secure transmission (MST).

20. The apparatus of claim 11, wherein the second device is a user equipment or wearable device.

* * * * *